Figure 1:
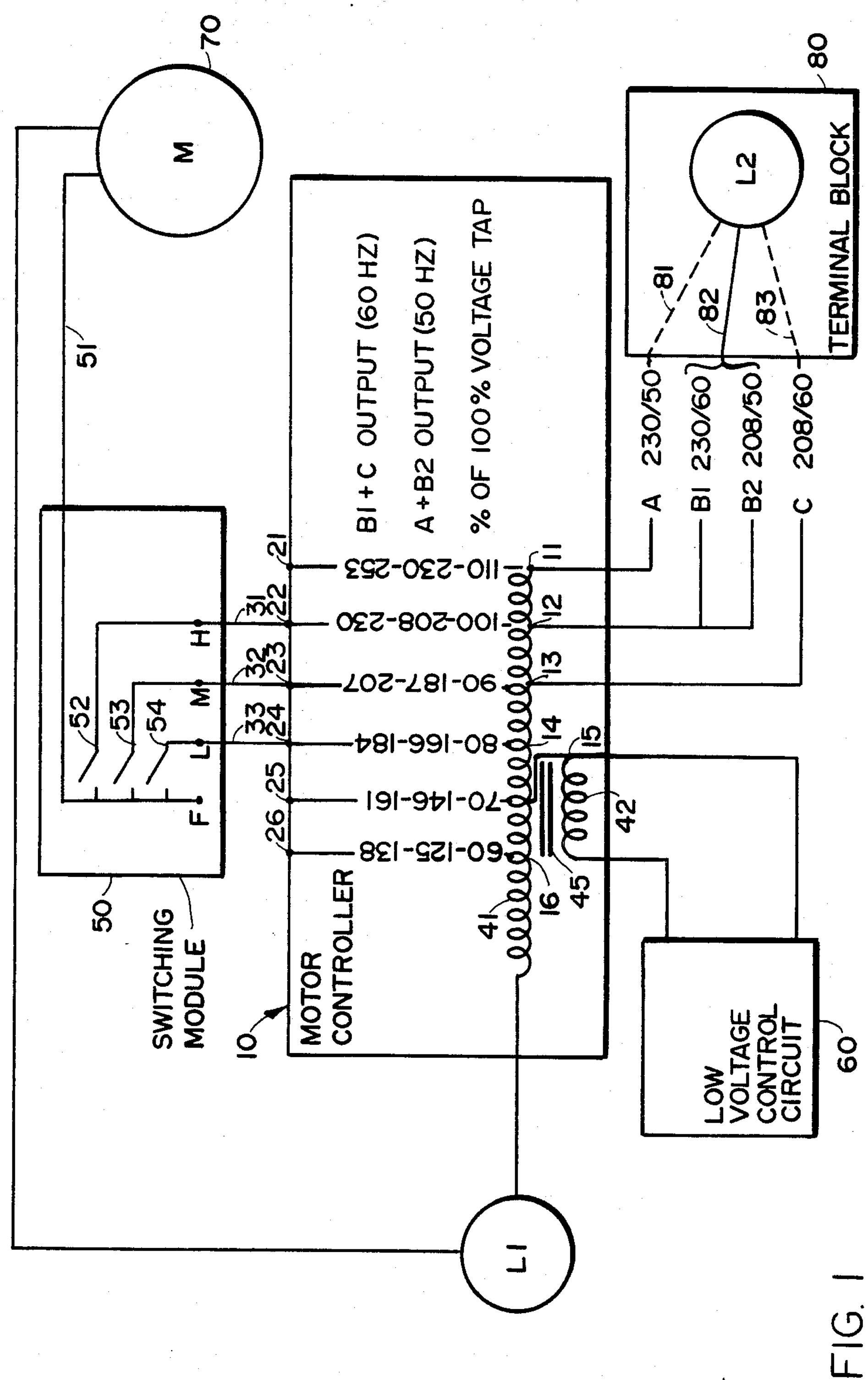

United States Patent [19]

Maudlin

[11] Patent Number: 4,673,850

[45] Date of Patent: Jun. 16, 1987

[54] UNIVERSAL MOTOR CONTROL SYSTEM

[75] Inventor: Wendell E. Maudlin, York, Pa.

[73] Assignee: York International Corp., York, Pa.

[21] Appl. No.: 885,309

[22] Filed: Jul. 14, 1986

[51] Int. Cl.[4] .................. H02P 7/64

[52] U.S. Cl. .................. 318/305; 318/815; 323/255; 323/256

[58] Field of Search .................. 318/813, 814, 815, 656, 318/654, 657, 658, 659, 660, 663, 666, 780, 245, 440, 441, 442, 305; 307/73, 75; 323/256, 255, 257, 258, 340, 341, 343, 259, 344

[56] References Cited

U.S. PATENT DOCUMENTS

| | | | |
|---|---|---|---|
| 1,519,284 | 12/1924 | Wilson | 323/256 |
| 2,417,754 | 3/1947 | Hibbard | 323/344 |
| 2,677,810 | 5/1954 | Lennox | 323/255 X |
| 2,805,378 | 9/1957 | Blondet et al. | 323/255 X |
| 3,392,325 | 7/1968 | Glowinski et al. | 323/340 |
| 3,513,380 | 5/1970 | Vargo | 323/255 |
| 3,621,374 | 11/1971 | Kettler | 323/343 |
| 3,824,449 | 7/1974 | Hase | 323/255 X |
| 4,130,789 | 12/1978 | Neumann | 200/11 TC X |
| 4,214,195 | 7/1980 | Logan | 318/815 X |
| 4,330,818 | 5/1982 | Peschel | 323/340 X |
| 4,363,060 | 12/1982 | Stich | 361/8 |
| 4,384,247 | 5/1983 | Stewart | 323/256 |
| 4,390,822 | 6/1983 | Wechsler | 323/255 X |
| 4,554,502 | 11/1985 | Rohatyn | 323/256 X |
| 4,591,779 | 5/1986 | Carpenter et al. | 323/255 X |

*Primary Examiner*—William M. Shoop, Jr.
*Assistant Examiner*—Shik L. Paul
*Attorney, Agent, or Firm*—Daniel J. O'Connor

[57] ABSTRACT

An electrical control means useful in systems wherein a motor, such as a blower motor for an air handling unit, must be run at different speed levels and wherein low voltage power must simultaneously be supplied to another part of the system such as a condenser unit. The invention combines auto-transformer and transformer technologies into a single motor control unit. Wiring to the auto-transformer portion of the unit is arranged in such manner that it may be readily field changed to accommodate the various line voltage and frequency levels encountered worldwide. Thus, a signle standardized unit allows accurate motor speed control and simultaneous low voltage power supply without motor overheating or instability under various line voltage and frequency conditions encountered throughout the world.

4 Claims, 1 Drawing Figure

UNIVERSAL MOTOR CONTROL SYSTEM

BACKGROUND AND OBJECTS OF THE INVENTION

The invention relates generally to a control means which allows a single standardized construction for an air handling unit which can be applied to various input line voltages and frequencies. While described as being specifically a motor control for heating, ventilating and air-conditioning air handling equipment, the system has broader application for multi-speed motor control systems which also need satisfy a separate low voltage requirement of the system.

In multi-speed motors designed for use on a worldwide basis, significant problems have arisen when a motor designed for a high-speed operation at 230 V/60 Hz is used in locations where the voltage and frequency vary from the 230 V/60 Hz norm. Other line voltage and frequency conditions encountered are 230 V/50 Hz, 208 V/50 Hz and 208 V/60 Hz.

When such alternate voltage and frequency conditions are encountered, poor motor speed control, high motor temperatures and unstable motor operation often result. Thus, motor life is shortened and performance reduced.

Other systems related to the present invention include extended winding motors, choke coils and auto-transformers. Such systems have proven either to be unstable for various voltage/frequency applications or have required a separate and costly transformer to supply the isolated low voltage needs of a heating and air conditioning system.

Accordingly, it is an object of the invention to provide a combined auto-transformer and transformer into a single construction which accomplishes motor speed control and which supplies a needed separate low voltage for a system.

It is a further object of the invention to provide a combined auto-transformer and transformer system wherein the auto-transformer is specially wired to accommodate the various voltages and frequencies encountered on a worldwide basis and still allow accurate, stable motor speed control without motor overheating.

It is a further object to provide that such combined auto-transformer and transformer system be utilized in conjunction with a line voltage terminal block in such manner that the unit may be easily field wired for any encountered voltage and frequency thus permitting efficient blower motor operation on a worldwide basis while using a single standardized motor design to reduce unit costs.

It is a still further object of the invention to incorporate the combined auto-transformer and transformer design into a high, medium and low blower motor speed system with stable motor operation at all speeds.

It is a further object to provide a combined auto-transformer and transformer system wherein the auto-transformer has specially designed tapping locations to allow variations on motor speeds if desired by the user.

These and further objects and advantages of the present invention will become apparent as the following description proceeds, and the features of novelty characterizing the invention will be pointed out with particularity in the claims annexed to and forming a part of this specification.

DESCRIPTION OF THE PRIOR ART

The following patents are listed as related generally to the present invention: U.S. Pat. Nos. 236,436 issued to Lyden on Mar. 26, 1941; 2,253,961 issued to Stonehill on Aug. 26, 1941; 1,958,104 issued to Kennedy on May 8, 1934; and 4,386,333 issued to Dillan on May 31, 1983.

The first three cited patents to Lyden, Stonehill and Kennedy show systems concerned with motor starting torque. Their object is to provide a higher voltage to an auxiliary circuit as the voltage on a main winding is reduced to reduce speed.

The system of the present invention does utilize a second winding to supply an isolated low voltage requirement but for purposes and in a manner different from the prior art systems.

The reference to Dillan uses a full power transformer with a tapped primary coil to accommodate varied input voltages supplied by security type plugs. The Dillan patent does not utilize the auto-transformer technology and does not use system tapping points in combination with the various components of the present invention.

SUMMARY OF THE INVENTION

The present invention utilizes an auto-transformer with tapping points therealong corresponding to 60, 70, 80, 90, 100 and 110 percent of voltage supplied from a given line voltage source. Although six tapping points are illustrated in the preferred embodiment, it is to be understood that fewer or more tapping points could be utilized and still fall within the intended spirit and scope of the present invention.

Of critical importance to the invention are the last three auto-transformer tapping points, i.e. at the 90, 100 and 110 percent levels. The 110 percent voltage tap is wired so as to receive an input voltage-frequency of 230 V/50 Hz when such is present on a supply line. The 90 percent voltage tap receives an input voltage-frequency of 208 V/60 Hz when such is present on a supply line. The 100 percent voltage tap receives an input voltage-frequency level of 230 V/60 Hz or 208 V/50 Hz depending upon which is present on the power supply line.

High, medium and low motor speeds are realized by tapping suitable points along the auto-transformer.

Attachment of the auto-transformer to the power supply is accomplished in a terminal block which allows easy field wiring depending on the voltage-frequency conditions encountered.

A secondary coil for isolated low voltage supply to a condensing unit control circuit is also provided. Importantly, such construction combines both an auto-transformer and a transformer into a single unit as a cost saving measure.

With the above system, a single standard motor winding design can be used worldwide and still attain maximum efficiency no matter what voltage-frequency supply levels are encountered in a particular geographic area. Motor speed is efficiently controlled without overheating by varying the voltage supplied to the motor by tapping off of different selected points on the auto-transformer in a particular manner to be described herein.

BRIEF DESCRIPTION OF THE DRAWING FIGURE

FIG. 1 illustrates the operational components of the present invention in schematic form.

FULL DESCRIPTION OF THE PREFERRED EMBODIMENT

As shown in FIG. 1, the motor controller 10 comprises an auto-transformer coil 41 and associated iron 45. The auto-transformer coil 41 has voltage tapping points 11 through 16 shown thereon corresponding to voltage levels of 110 to 60 percent of that supplied by the line voltages L1 and L2.

In the lower portion of FIG. 1, lines A, B1, B2 and C are used to designate the four possible line supply voltage frequency combinations available in various locations of the world. If, for example, a line supply of 230 V/50 Hz were available at L2, then line 81 would be connected to the supply L2 via a terminal block 80.

If a line supply at L2 is 230 V/60 Hz or 208 V/50 Hz, then line 82 would be connected to the L2 power supply. If a line supply at L2 is 208 V/60 Hz, then line 83 would be connected to the L2 power supply. It is noted that, upon shipment of the unit from the factory, line 82 would normally be connected in the terminal block 80 to accommodate the most likely to occur voltage-frequency level of 230 V/60 Hz.

However, with sales of the unit on a worldwide basis, conditions of 230 V/50 Hz or 208 V/60 Hz may well be encountered in which case, line 82 may be easily removed and lines 81 or 83 respectively may be attached to the L2 power supply.

It has been found by the inventor herein that such arrangement yields a stable motor run condition at high, medium and low speed levels no matter which voltage-frequency levels are encountered.

Power to the motor 70 is controlled by the switching module 50 via line 51. If a low blower motor speed is called for by suitable controllers known in the art, not shown and not forming part of the invention, then switch 54 is closed and a low voltage is supplied to the motor 70 via line 51. Similarly, if medium or high blower motor speeds are called for, then switches 53 or 52, respectively, are closed to supply a desired voltage level to the motor 70.

As shown in the arrangement of FIG. 1, lines 31, 32 and 33 are connected to the high medium and low power conveying lines respectively. The input to lines 31, 32 and 33 is from the autotransformer remote tapping points 22, 23 and 24 respectively.

From the tabular portion of FIG. 1, it is seen that, for an L2 level of 230 V/50 Hz, in which the A line is connected to L2, line 31 receives a voltage of 208 V and 50 Hz. Line 32, the medium speed power conveyance line, receives a voltage of 187 V and 50 Hz. Line 33, the low speed power conveyance line, receives a voltage of 166 V and 50 Hz.

While lines 31, 32 and 33 are shown as connected to remote tapping points 22, 23 and 24, such arrangement may be varied depending on the requirements of the particular customer. For example, if a reduced low motor speed is deemed desirable, then line 33 may be connected to the leftmost remote tapping point 26. Numerous other combinations of connections for lines 31, 32 and 33 are possible as will be appreciated by those of skill in the art.

It is noted, however, that tapping points 11, 12 and 13 would always be used on the auto-transformer coil 41 itself.

What the invetor herein has discovered is that the particular line connections and tapping arrangements shown yield a stable blower motor operation at high, medium and low motor speeds and at all of the possible voltage-frequency combinations.

In the particular system contemplated for use, motor 70 would be utilized as the blower motor for the evaporative portion of an air-conditioning unit. The system would also include a condensing unit, not shown, which would require a low voltage condensing unit control circuit 60. Such control circuit 60 would normally be a Class II control requiring a low voltage and thus a separate transformer from the power source L2.

It has been found by the inventor, and is a further important aspect of the invention, that such low voltage requirement may be achieved by combining a normally separate transformer into the auto-transformer previously described. Thus, as shown a secondary coil 42 is added to the auto-transformer 41 with the iron 45 shown schematically therebetween. In the arrangement shown, a 50 Hz input from the L2 power source produces a 22 V output to the condensing unit control circuit. A 60 Hz input from the L2 power source produces a 24 V output to the condensing unit control circuit 60.

It will thus be appreciated that significant cost savings are effected by combining an auto-transformer and a transformer into a single controller 10 for use in an air-conditiong, ventilating or heating system.

Of further important cost-saving consequence is the fact that the same motor 70 is used for all similar capacity units regardless of the L2 voltage-frequency levels encountered in different geographic locations. Thus, motor 70 becomes a standardized component of the system and the unit can be sold worldwide on a more cost-effective basis.

The benefits of the above-described system may be more fully appreciated by considering the example of a country, such as Saudi Arabia, which has both 50 Hz and 60 Hz power supplies.

In normal systems, motor 70 would require a different configuration for the 50 Hz and 60 Hz applications. Otherwise, motor instability and overheating would occur at one of the frequency supply levels. However, with the present inventive system, a single standardized motor 70 is utilized with the L2 wiring lines 81, 82 and 83 being easily changed by a field technician depending on which frequency level is encountered.

Further, a single standardized overall unit design accommodates all required voltage-frequency levels while economically combining the two functions of motor speed control and power supply to an isolated low voltage circuit.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In a system requiring motor control at multiple speed levels and power supply to an isolated low voltage control circuit (60), an auto-transformer coil (41) having at least first, second and third tapping points (11, 12, 13) formed thereon, said tapping points corresponding to levels of 110 percent, 100 percent and 90 percent of an available power supply line voltage (L2), first line means (81) extending from said first auto-transformer tapping point (11) for attachment to and receipt of power from a terminal block (80) when a power supply (L2) of 230 V/50 Hz is encountered, second line means (82) extending from said second auto-transformer tapping point (12) for attachment to and receipt of power from a terminal block (80) when a power supply (L2) of 230 V/60 Hz or 208 V/50 Hz is encountered, third line means (83) extending from said third auto-transformer tapping point (13) for attachment to and receipt of power from a terminal block (80) when a power supply (L2) of 208 V/60 Hz is encountered, a motor control unit (10) which contains said auto-transformer coil (41) and at least first, second and third remote tapping points (22, 23, 24) formed as a part of said motor control unit, a first line means (31) for conveyance of high speed motor voltage from said first remote tapping point (22), a second line means (32) for conveyance of medium speed motor voltage from said second remote tapping point (23), a third line means (33) for conveyance of low speed motor voltage from said third remote tapping point (24), switch means (52, 53, 54) for conveying a desired power level to a line (51) to a motor (70) to be run at differing speeds, wherein said motor control unit (10) further includes a secondary transformer coil means (42) for supply of low voltage power to a low voltage control circuit (60).

2. The system of claim 1 wherein said low voltage control circuit (60) comprises a condensing unit control circuit.

3. The system of claim 1 wherein said motor (70) comprises an evaporator blower unit as part of an air-conditioning system.

4. The system of claim 1 wherein said motor control unit (10) includes at least fourth, fifth and sixth remote tapping points (21, 25, 26) from said auto-transformer coil (41) and means for adjusting said first, second and third line means (31, 32, 33) along said fourth, fifth, and sixth remote tapping points to vary the speed of the motor (70).

* * * * *